United States Patent [19]

Drawert et al.

[11] 3,900,436

[45] Aug. 19, 1975

[54] POLYESTERAMIDE RESIN

[75] Inventors: Manfred Drawert, Werne; Eugen Griebsch, Unna; Bernhard Krieger, Bergkamen; Horst Schepp, Altluenen; Christian Burba, Luenen, all of Germany

[73] Assignee: Schering Aktiengesellschaft, Berlin and Bergkamen, Germany

[22] Filed: Aug. 30, 1972

[21] Appl. No.: 260,800

[30] Foreign Application Priority Data
June 11, 1971 Germany.............................. 2128984

[52] U.S. Cl.................. 260/18 N; 106/27; 106/28; 260/22 R; 260/404.5
[51] Int. Cl............................................ C08g 20/30
[58] Field of Search............ 260/18 N, 22 R, 404.5, 260/37 N; 106/27, 28

[56] References Cited
UNITED STATES PATENTS

| | | | |
|---|---|---|---|
| 3,224,893 | 12/1965 | Floyd et al. | 260/404.5 |
| 3,268,461 | 8/1966 | Jacobson | 260/18 |
| 3,347,882 | 10/1967 | Zuppinger et al. | 260/404.5 |
| 3,449,273 | 6/1969 | Kettenring et al. | 260/18 |
| 3,483,149 | 12/1969 | Gresenz et al. | 260/18 |
| 3,502,602 | 3/1970 | Helm et al. | 260/18 |
| 3,511,792 | 5/1970 | Helm et al. | 260/22 |
| 3,554,944 | 1/1971 | Helm et al. | 260/18 |

*Primary Examiner*—Eugene C. Rzucidlo
*Attorney, Agent, or Firm*—Curtis, Morris & Safford

[57] ABSTRACT

A polyesteramide resin adaptable to use in formulating laminable printing inks, said resin comprising a mixture of dimeric $C_8$–$C_{24}$ fatty acid and monomeric $C_{16}$–$C_{18}$ fatty acid as the acid component, and a mixture of ethylene diamine with an aliphatic polyol, an aliphatic amino alcohol, or an epoxy alcohol or diepoxy compound as the component condensed therewith.

2 Claims, No Drawings

POLYESTERAMIDE RESIN

The present invention relates to a polyesteramide resin adaptable to use in formulating laminable printing inks.

Because of their good printing properties, certain polyamides and polyesteramides have heretofore been used as binders in inks for printing films of synthetic resins such as polyethylene and hydrated cellulose. In order to impart certain properties — such as resistance to the transmission of water vapor and gas — to the printed films, they must be laminated with a second film having these properties.

The aforementioned printing ink binders are not laminable or are insufficiently laminable because the adhesives developed and used for lamination (generally polyesterurethane prepolymers cross-linked by the inclusion of polyisocyanates) do not adhere to the polyamide- or polyesteramide-printed films. For example, the firm of Herberts, Wuppertal-Barmen, Germany, in its publication "Kaschierkleber, Primer, Glanzlacke fuer Flexible Verpackungen", published in 1969, states on page 3:

"When using printing inks comprising polyamides . . . difficulties in bonding are always to be expected. Inks comprising other binders can, in general, be used."

Thus, there is a need for printing ink binders suitable for lamination which have the known good properties of polyamide resins.

It has now been found that a printing ink resin having good adhesion to the lamination adhesives conventionally employed in commerce is obtained if one substitutes a polyfunctional alcohol having at least three hydroxy groups for a small portion of the diamine in a polyamide resin comprising polymerized fatty acids and ethylene diamine. Also, polyfunctional hydroxy amines having at least three functional groups are suitable for the same purpose.

Surprisingly, only a very small amount of the hydroxy compound is required in order to evoke a strong increase in adhesion of a polyamide printing resin to the lamination adhesives common in commerce.

For the laminability of the polyesteramide resins according to the invention, it is unimportant whether free primary or free secondary hydroxyl groups are present in the polyesteramide. Thus, in a polyamide comprising dimerized fatty acid and ethylene diamine, one can replace a certain molar fraction of the ethylene diamine either with an aliphatic polyalcohol or with an aliphatic amino alcohol, and these compounds may contain primary and/or secondary hydroxy groups.

As examples of aliphatic polyols which are suitable for the preparation of laminable polyesteramides according to the present invention, glycerin, trimethylol propane, butane triol-1,2,4, hexane triol-1,2,6, and sugar alcohols such as mannitol, sorbitol, and the like, can be named.

As amino alcohols, di- and tri-n-alkanolamines and di- and tri-iso-alkanolamines, such as di-n- and di-isopropanolamine and tri-n- and tri-iso-propanolamine, can be used, as well as N,N-diethoxylated or dipropoxylated diamines. Diethanolamine and tri-ethanolamine, N,N-bis-hydroxyethyl trimethylene diamine, i.e. [$H_2N(CH_2)_3N(CH_2CH_2OH)_2$], and the compound obtained by the dicyanoethylation of glycerine with subsequent hydrogenation of the nitrile groups, are further examples of such compounds.

Also, compounds having one or two epoxy groups and which first generate free hydroxy groups by reaction with a dimerized fatty acid can be employed, such as for example glycidol (2,3-epoxy-1-propanol) or a diepoxide such as, for example, the epoxy compound which is formed by the condensation of diphenylol propane with epichlorohydrin. These materials are equivalently suitable for the preparation of polyester amides.

The ethylene diamine necessary for the diamine component of the polyamide resins of the present invention can, optionally, contain small amounts of other diamines such as propylene diamine 1,2; 1-amino-3-aminomethyl-3,5,5-trimethylcyclohexane; or 4,4'-diamino 3,3'-dimethyldicyclohexylmethane.

For preparation of the polyesteramides of the invention, those dimeric fatty acids are used which can be obtained by the free radical, ionic, or thermal polymerization of fatty acids. The fatty acid can be a saturated or a mono-or poly-ethylenically or acetylenically unsaturated natural or synthetic aliphatic monobasic acid, suitably having 8 to 24 carbon atoms. These fatty acids can be polymerized by different means, but all give functionally similar products which can generally be characterized as polymeric fatty acids. The polymer products usually contain a predominant amount of dimeric fatty acids, and smaller amounts of trimeric or higher polymeric, as well as monomeric, fatty acids. The term "dimeric fatty acid" as used in the specification and claims is to be understood to refer also to such mixtures containing small quantities of non-dimeric materials.

Polymerization of saturated fatty acids can be carried out at elevated temperatures with peroxide catalysts such as di-t-butyl peroxide, for example. The straight chain and branch-chain acids such as caprylic, pelargonic, capric, lauric, myristic, palmitic, isopalmitic, stearic, arachidic, behinic, and lignoceric acids are suitable saturated fatty acids. However, this process is of little interest because of the small yield.

The polymerization of ethylenically unsaturated fatty acids is much more common. This can be done with or without catalysts, but uncatalyzed polymerization requires higher temperatures. Suitable catalysts are acid or alkaline clays, di-t-butyl-peroxide, boron trifluoride and other Lewis acids, anthraquinone, sulfur trioxide, and the like. The monomeric fatty acids commonly polymerized include the branched-chain and straight-chain, poly- and/or mono-ethylenically unsaturated acids such as 3-octene acid, 11-dodecene acid, linderic acid, lauroleic, oleic, elaidic, vaccenic, gadoleic, cetoleic, erucic, linoleic, linolenic, elaostearic, arachidic, clupanodonic, nisinic, and chaulmoogra oil acid.

The acetylenically unsaturated fatty acids, which can be polymerized in the absence of catalysts because of their higher reactivity, seldom occur in nature and are expensive to synthesize. For this reason they are economically less interesting. A number of acetylenically unsaturated fatty acids, either straight chain or branch chain, mono-unsaturated or polyunsaturated, can be used for the preparation of polymeric fatty acids. For example, 6-octadecyn, 9-octadecyn, 13-dokosyn, and 17-octadecen-9,11-diyn acids can be mentioned.

Because of their low cost and relatively easy polymerizability, oleic acid and linoleic acid are preferred as starting materials for the preparation of polymeric fatty acids.

The usual approximate composition of the commercial dimeric fatty acid product prepared from an unsaturated $C_{18}$-fatty acid is: 5–15 percent by weight of $C_{18}$-monocarboxylic acid, 60–80 percent by weight of $C_{36}$-dicarboxylic acid, and 10–35 percent by weight of $C_{54}$-tricarboxylic acid and higher carboxylic acid products.

The mixtures obtained by polymerization can be fractionated by the usual distillation or solvent extraction methods. They can be hydrogenated before or after distillation in order to decrease the degree of unsaturation using high pressure hydrogen in the presence of a hydrogenation catalyst.

To adjust the viscosity of the polyesteramide product to a desired value between 15 and 40 poises at 160°C., one or more monomeric $C_{16}$–$C_{18}$ fatty acids such as palmitic, oleic, or stearic acid, or a natural fatty acid mixture such as soya fatty acid or tall oil fatty acid, is combined with the dimeric fatty acid. In general, the amount of monomeric acid is from 5 to 15 percent by weight of the total fatty acid mixture, the preferred amount being determined by preliminary condensations and measurement of the viscosity of the polymer product.

The polyamide resins according to the present invention can be prepared in a known fashion by reaction of the ethylene diamine and polyol component with the dimerized fatty acid and the monocarboxylic acid at condensation temperatures between 180°–250°C., particularly at 230°C.

However, if components containing epoxy groups are employed, the preparation is advantageously carried out by a two-step condensation. In the first step, the fatty acid component is reacted with the epoxy component, for which a reaction time of about 2 hours at 200°C. is sufficient. The product is then cooled to about 150°C. and the calculated amount of diamine is added. Further condensation proceeds as described just above.

For the preparation of polyamide printing resins comprising dimerized fatty acids, equivalent amounts of ethylene diamine and acid component are usually employed. In the resins of the present invention, the replacement of from 5 to 20 equivalent percent of the diamine with a polyhydroxy component and the use of an excess of from 5 to 20 equivalent percent of hydroxy compound impart laminability to films imprinted with inks prepared therefrom. These amounts of polyhydroxy compounds exert no disadvantageous influence on the printing properties of the resulting resins. To be sure, the softening point may under certain conditions decrease by a small amount. However the blocking temperature, which is considered by the printing technician to be far more important, stays the same in value. The gloss of the imprint as well as the loss of solvent from the printing ink solution also are of the same extent as before.

A better understanding of the present invention and of its many advantages will be had by referring to the following specific examples given by way of illustration.

In the Examples, the Kofler blocking point values are determined as follows. The finely-ground resin having a particle size of 200–300 microns is sprinkled on a Kofler bench. After 90 seconds, the resin is swept off with a flat brush. The temperature limit at which the strewn resin particles can no longer be swept off is designated as the Kofler blocking temperature.

EXAMPLE 1

360 grams of dimerized tall oil fatty acid of the following composition:

| | |
|---|---|
| Monomeric Fatty acid | 7.9% |
| Dimerized Fatty acid | 73.7% |
| Tri- and higher-polymerized fatty acids | 18.4% | are mixed with 40 g of monomeric tall oil fatty acid, 38.03 g of ethylene diamine (0.9 equivalent) and 9.41 g of trimethylol propane (0.15 equivalent). The reaction mixture is heated to 230°C. in nitrogen over a period of 2 hours. The reaction temperature of 230°C. is maintained for 4 hours. During the last 2 hours, a vacuum of 20 mmHg is applied in order to complete the condensation. The product has a softening point (ring and ball, DIN 1995) of 103°C., a Kofler blocking point of 96°C., and a melt viscosity of 17 poises at 160°C. Amine number = 6.0; acid number = 6.2; hydroxy number = 9.35.

A printing ink formulated with this resin is shown in Example 9. Resins having equally satisfactory laminability are obtained when dimerized soya-, linseed-, or peanut-oil fatty acids, or ricinine fatty acids are substituted for tall oil fatty acids.

EXAMPLES 2–7

The results of these Examples are tabulated below in Table 1. The samples were prepared as in Example 1.

TABLE I

| Example No. | Tall Oil Fatty Acid Polymer (g) | Monomer (g) | Equivalents | Ethylene Diamine (g) | Eq. | Polyol or Amino Alcohol (g) | Eq. | Ring and Ball Softening Point (°C.) | Kofler Blocking Point (°C.) | Melt Viscosity at 160°C. (Poises) |
|---|---|---|---|---|---|---|---|---|---|---|
| 1 | 360.0 | 40.0 | 1.0 | 38.03 | 0.9 | 9.41 trimethylolpropane | 0.15 | 103 | 96 | 17 |
| 2 | 370.0 | 30.0 | 1.0 | 38.03 | 0.9 | 12.76 1,2,6-hexanetriol | 0.2 | 101 | 94 | 33.8 |
| 3 | 370.0 | 30.0 | 1.0 | 38.03 | 0.9 | 6.46 glycerin | 0.15 | 108 | 94 | 28.8 |
| 4 | 348.0 | 52.0 | 1.0 | 38.03 | 0.9 | 7.38 diethanolamine | 0.15 | 105 | 92 | 28.9 |
| 5 | 370.0 | 30.0 | 1.0 | 38.03 | 0.9 | 12.79 d-sorbite | 0.3 * | 105 | 95 | 30.2 |
| 6 | 370.0 | 30.0 | 1.0 | 38.03 | 0.9 | 10.48 triethanolamine | 0.15 | 104 | 97 | 28.1 |
| 7 | 370.0 | 30.0 | 1.0 | 38.03 | 0.9 | 7.62 1,2,4-butanetriol | 0.15 | 102 | 98 | 27.3 |
| 8 | 370.0 | 30.0 | 1.0 | 38.03 | 0.9 | 26 epoxy resin | 0.2 | 100 | 92 | 23 |

* This polyamide, containing an excess of 20 equivalent percent of hydroxy component, has an hydroxy number of 37.1.

EXAMPLE 8

370 g of dimerized tall oil fatty acid having the composition given in EXAMPLE 1 are mixed with 30 g of monomeric tall oil fatty acid and 26 g (0.1 equivalent) of a liquid epoxy resin comprising diphenylol propane having an epoxy value of 0.54. The mixture is heated to 200°C. over 45 minutes. The batch is maintained at this temperature for 3 hours and then cooled to 70°C. After the addition of 38 g of ethylene diamine, the mixture is heated to 230°C. in 60 minutes and held at 230°C. for 2 hours. During the last hour, a vacuum of 20 mmHg is applied for better complete condensation.

The resin obtained has a ring and ball softening point of 100°C., a Kofler blocking point of 92°C., and a viscosity of 23 poises at 160°C.

EXAMPLE 9

A printing ink was made from the resin of Example 1 by combining 30 parts by weight of the resin with 30 parts of absolute ethanol, 30 parts of benzine (65°–95°C.), and 10 parts of a red pigment ("Litholrot 3740," BASF).

A second ink was prepared from the same ingredients but substituting 30 parts of a commercial polyamide printing ink resin ("Versamide 930") for the polyesteramide resin of Example 1.

In both cases, the resin was first dissolved in the solvent mixture with moderate warming to give a clear varnish. The pigment is worked into a portion of this varnish with a ball mill. After dispersion is complete, this colorant is combined with the remaining varnish. If necessary, the mixture is diluted to a printing viscosity of 25–30 seconds (discharge time from a DIN-4 efflux cup at 20°C.).

The ink is next printed onto cellophane film using a roll-on-roll intaglio process. The printed film side is subsequently laminated to a polyethylene film using a suitable commercial lamination adhesive ("EPS 700", Firma Herberts) at a maximum coating thickness of 3g/m$^2$. After 4 weeks' storage, the bond adhesion was measured (peel-angle = 180°C.). The bond strength on the ink surface of the present invention was 161 grams of force/cm: the bond on the commercial ink sample showed no measurable adhesion.

What is claimed is:

1. A polyesteramide resin having an hydroxy number between 9.35 and 37.1, said resin comprising
   1. an acid component comprising
      A. 85 to 95 percent by weight of a polymerized $C_8$–$C_{24}$ fatty acid product containing from 5 to 15 percent by weight of monomeric fatty acid, 60 to 80 percent of dimeric fatty acid, and 10 to 35 percent by weight of trimeric and higher fatty acid polymers, and
      B. 15 to 5 percent by weight of an additional monomeric $C_{16}$–$C_{18}$ fatty acid;

and condensed therewith in a substantially equivalent amount,
   2. a second component comprising
      A. from 5 to 20 equivalent percent of an aliphatic polyol having at least three primary or secondary hydroxy groups and
      B. 95 to 80 percent of ethylene diamine, said resin additionally comprising an excess of 5 to 20 equivalent percent of hydroxy component condensed with said acid component.

2. In a printing ink comprising a pigment, a polyesteramide resin binder, and a volatile solvent for said binder, the improvement wherein said polyesteramide resin is the resin of claim 1.

* * * * *

UNITED STATES PATENT OFFICE
CERTIFICATE OF CORRECTION

Patent No. 3,900,436　　　　　　　　Dated August 19, 1975

Inventor(s) Manfred Drawert  et al

It is certified that error appears in the above-identified patent and that said Letters Patent are hereby corrected as shown below:

In Item [22] of the Heading, correct the filing date to read -- June 8, 1972 --.

Signed and Sealed this fourth Day of November 1975

[SEAL]

Attest:

RUTH C. MASON
*Attesting Officer*

C. MARSHALL DANN
*Commissioner of Patents and Trademarks*